(12) United States Patent
Colven et al.

(10) Patent No.: US 8,880,699 B2
(45) Date of Patent: Nov. 4, 2014

(54) MAPPING SERVICES TO A TRANSPORT MECHANISM

(75) Inventors: David M. Colven, Dallas, TX (US); Li-Chang J. Lin, New Hempstead, NY (US); Snigdho C. Bardalai, Plano, TX (US); Abed M. Jaber, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 2213 days.

(21) Appl. No.: 11/255,452

(22) Filed: Oct. 20, 2005

(65) Prior Publication Data

US 2007/0094403 A1    Apr. 26, 2007

(51) Int. Cl.
*G06F 15/173* (2006.01)
*H04L 29/08* (2006.01)
*H04L 29/06* (2006.01)

(52) U.S. Cl.
CPC ............ *H04L 67/322* (2013.01); *H04L 69/326* (2013.01); *H04L 69/18* (2013.01)
USPC ............ 709/226; 709/227; 709/228; 709/249

(58) Field of Classification Search
USPC .................................. 709/226, 227, 228, 249
See application file for complete search history.

(56) References Cited

U.S. PATENT DOCUMENTS

2003/0103503 A1* 6/2003 Dubuc et al. .................. 370/392
2008/0279196 A1* 11/2008 Friskney et al. ............... 370/395

FOREIGN PATENT DOCUMENTS

JP          2001345862      6/2000
WO     WO2004/034592     4/2004

OTHER PUBLICATIONS

System V Interface Definition, Fourth Edition, vol. 1, pp. 1-720 (Jun. 1995, obtained from http://www.sco.com/developers/devspecs/vol1a.pdf on Jan. 15, 2009).*

Metro Ethernet Forum, "*Metro Ethernet Networks—A Technical Overview*," © The Metro Ethernet Forum 2002-2004, v2.1, http://www.metroethernetforum.org, pp. 1-17, Dec. 2003.
Metro Ethernet Forum, "*Introduction to Circuit Emulation Services over Ethernet*," © The Metro Ethernet Forum 2004, v1.0, http://www.metroethernetforum.org, pp. 1-6, Feb. 2004.
Metro Ethernet Forum, "*Catch the Carrier Ethernet Wave Superdemo 2005, First Demonstration of Carrier Ethernet Services*," A Metro Ethernet Forum White Paper, © Metro Ethernet Forum 2005, http://www.metroethernetforum.org, pp. 1-12, Jun. 7, 2005.
Metro Ethernet Forum, "*Ethernet in the Metro, Status; Services; and the role of: Metro Ethernet Forum*," http://www.metroethernetforum.org, pp. 1-29, Printed Oct. 17, 2005.
Patent Application No. 2006-285099; "Notifications of Reason for Refusal", 5 pages.
Tsuchiya, et al., "Support for Contents Sharing by use of Multimedia Contents Mill", 8 pages.

* cited by examiner

*Primary Examiner* — Liangche A Wang
*Assistant Examiner* — Cheikh Ndiaye
(74) *Attorney, Agent, or Firm* — Baker Botts L.L.P.

(57) ABSTRACT

Providing a service includes establishing service parameter values for a service, where a service parameter value describes a metric of the service. The service parameter values are mapped to first network parameter values operable to configure a first wide area network port for a first transport mechanism. The service is provided over the first transport mechanism. The service parameter values are mapped to second network parameter values operable to configure a second wide area network port for a second transport mechanism. The service is provided over the second transport mechanism.

20 Claims, 4 Drawing Sheets

MAPPING SERVICES TO A TRANSPORT MECHANISM

TECHNICAL FIELD

This invention relates generally to the field of optical networks and more specifically to mapping services to a transport mechanism.

BACKGROUND

A communication network may be used to deliver services to users over any of a number of suitable transport mechanisms. The services may be mapped to the transport mechanisms to deliver the services. Known techniques for mapping services, however, may be inefficient in certain situations. It is generally desirable to have efficient methods for mapping services.

SUMMARY OF THE DISCLOSURE

In accordance with the present invention, disadvantages and problems associated with previous techniques for mapping services may be reduced or eliminated.

According to one embodiment of the present invention, Providing a service includes establishing service parameter values for a service, where a service parameter value describes a metric of the service. The service parameter values are mapped to first network parameter values operable to configure a first wide area network port for a first transport mechanism. The service is provided over the first transport mechanism. The service parameter values are mapped to second network parameter values operable to configure a second wide area network port for a second transport mechanism. The service is provided over the second transport mechanism.

Certain embodiments of the invention may provide one or more technical advantages. A technical advantage of one embodiment may be that service parameters may be used to map a service to a transport mechanism. The service parameter values of a service may be mapped to network parameter values of a transport mechanism to provide the service over the transport mechanism. The same service parameter values may be used to provide the service over different transport mechanisms. Accordingly, service parameters may allow for efficient mapping and re-mapping of a services.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
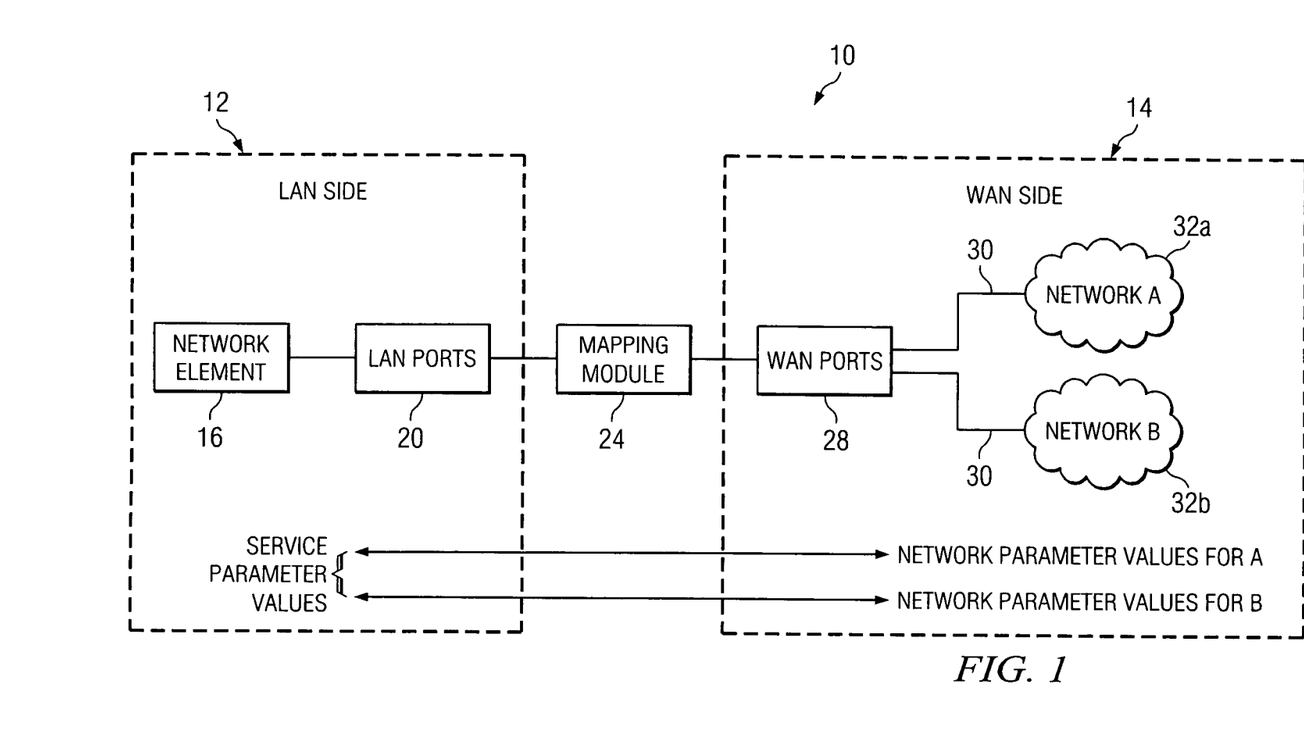
FIG. 1 is a block diagram illustrating one embodiment of a system in which services are mapped to transport mechanisms.

FIG. 1 is a block diagram illustrating one embodiment of a system 10 in which services are mapped to transport mechanisms. According to the embodiment, service parameter values may be used to describe a service. System 10 may map the service parameter values of a service to network parameter values of a transport mechanism to provide the service over the transport mechanism. The same service parameter values may be used to provide the service over different transport mechanisms. Accordingly, system 10 may allow for efficient mapping and re-mapping of a service.

According to one embodiment, system 10 communicates information through signals. A signal may refer to an optical signal transmitted as light pulses. As an example, an optical signal may have a frequency of approximately 1550 nanometers and a data rate of 10, 20, 40, or over 40 gigabits per second.

A signal may communicate information in packets. A packet may comprise a bundle of data organized in a specific way for transmission, and a frame may comprise the payload of one or more packets organized in a specific way for transmission. A packet may carry any suitable information such as voice, data, audio, video, multimedia, control, signaling, other information, or any combination of the preceding. The packets may comprise any suitable multiplexed packets, such time division multiplexed (TDM) packets.

System 10 may be used to provide a service to a user. A service may refer to a communication service that is provided by a service provider to a user. The service may have an agreed upon level of service according to which the service provider is required to provide the service to the user. The agreed upon level of service may be designated using metrics that describe constraints that the service is required to satisfy. The constraints for a given service may have specific metric values for the metrics.

Metrics may describe constraints for bandwidth, availability, response, delivery, or other aspect of a service. Example bandwidth constraints may include a guaranteed bandwidth. Example availability constraints may include an average availability, an average or maximum restoration time, and an average or maximum period of outage. Example response constraints may include an average or maximum delay, an average or maximum response time, and an average or maximum latency. Example delivery constraints may include an average or minimum data rate.

According to the illustrated embodiment, system 10 has a local area network (LAN) side 12 and a wide area network (WAN) side 14. A local area network may refer to a communications network that couples communication devices within a limited region such as a building or campus. Typically, devices of a local area network may communicate with each other by transmitting information directly to each other without transmitting the information outside of the network. A local area network may operate according to any suitable protocol, for example, the Ethernet protocol.

A wide area network may refer to a communications network that extends to a region beyond a local area network. A wide area network may cover a metropolitan area, a national area, or an international area. Devices of a local area network may communicate to devices of another local area network by transmitting information through a wide area network.

According to the illustrated embodiment, LAN side 12 includes one or more network elements 16 and one or more LAN ports 20. A network element 16 may represent any suitable device operable to route packets to or from LAN ports 20. Examples of network elements 16 include dense wavelength division multiplexers (DWDMs), access gateways, endpoints, softswitch servers, trunk gateways, access service providers, Internet service providers, or other device operable to route packets to or from LAN ports 20. A LAN port 20 may represent a port of a local area network, and may comprise an Ethernet port.

According to the illustrated embodiment, WAN side 14 includes one or more WAN ports 28, fibers 30, and one or more networks 32. A WAN port 28 may represent a port of a wide area network, and may comprise ports operable to communicate with networks 32.

Fibers 30 may represent any suitable fiber operable to transmit a signal. According to one embodiment, a fiber 30 may represent an optical fiber. An optical fiber typically comprises a cable made of silica glass or plastic. The cable may have an outer cladding material around an inner core. The inner core may have a slightly higher index of refraction than the outer cladding material. The refractive characteristics of the fiber operate to retain a light signal inside of the fiber.

A network 32 may have any suitable number of fibers 30, for example, two fibers 30. As an example, the first fiber 30 traverses a network 32 in one direction, and the second fiber traverses network 32 in the other direction. A ring segment may refer to the portion of fibers 32 between network elements, and may be designated by the specific ports of network elements coupled by the ring segment.

Network 32 may represent a ring network of communication devices that has a ring topology. According to one embodiment, network 32 may comprise an optical fiber ring network. Network 32 may utilize a particular transport mechanism. As an example, a transport mechanism may be identified by a transport protocol, such as the Synchronous Optical Network (SONET) protocol, the Pseudo-Wire Emulation (PWE) over SONET protocol, or the Resilient Packet Ring (RPR) over SONET protocol.

According to one embodiment, system 10 may include a mapping module 24 that maps parameters to provide a service. According to the embodiment, service parameters for configuring LAN ports 20 may be used to designate the metrics of a service on LAN side 12. A metric may correspond to a service parameter, and a metric value for a service may be expressed using a service parameter value of the service parameter. Network parameters for configuring WAN ports 28 may be used to designate the metrics of a service for networks 32 on WAN side 14. Service parameter values of a service may be mapped to network parameter values to designate the metrics for the service.

Different transport mechanisms may have different network parameter values for the same metric value. According to one embodiment, the same service parameters may be used to designate metrics for networks having different transport mechanisms. As an example, a service parameter value may be mapped to a first network parameter value of a network with a first transport mechanism, and the same service parameter value may be mapped to a second network parameter value of a network with a second transport mechanism. The service parameters may allow for efficient re-mapping of a service from the first transport mechanism to the second transport mechanism.

According to one embodiment, a general set of commands may be used to link the service parameter values to the different network parameter values of different transport mechanisms. The commands may be provided in any suitable manner, for example, as Transaction Language 1 (TL1) commands, Simple Network Management Protocol (SNMP) commands, command line interface (CLI) commands, or other suitable manner. The command allow for mapping services independent of the underlying transport mechanism. Accordingly, the services may be defined by parameters at Layer 2 rather than Layer 3 of the Open Systems Interconnection (OSI) model.

According to the embodiment, a user may initiate the mapping by entering a service parameter value for a service. Alternatively, a user may initiate the mapping by selecting a service, which may automatically enter the service parameter value. The commands may be operate to link the service parameter value to the appropriate network parameter value. The command set may include any suitable commands.

A component of system 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to network system 10 without departing from the scope of the invention. The components of network system 10 may be integrated or separated according to particular needs. Moreover, the operations of network system 10 may be performed by more, fewer, or other devices. Additionally, operations of network system 10 may be performed using any suitable logic. As used in this document, "each" refers to each member of a set or each member of a subset of a set.

Figure 2:
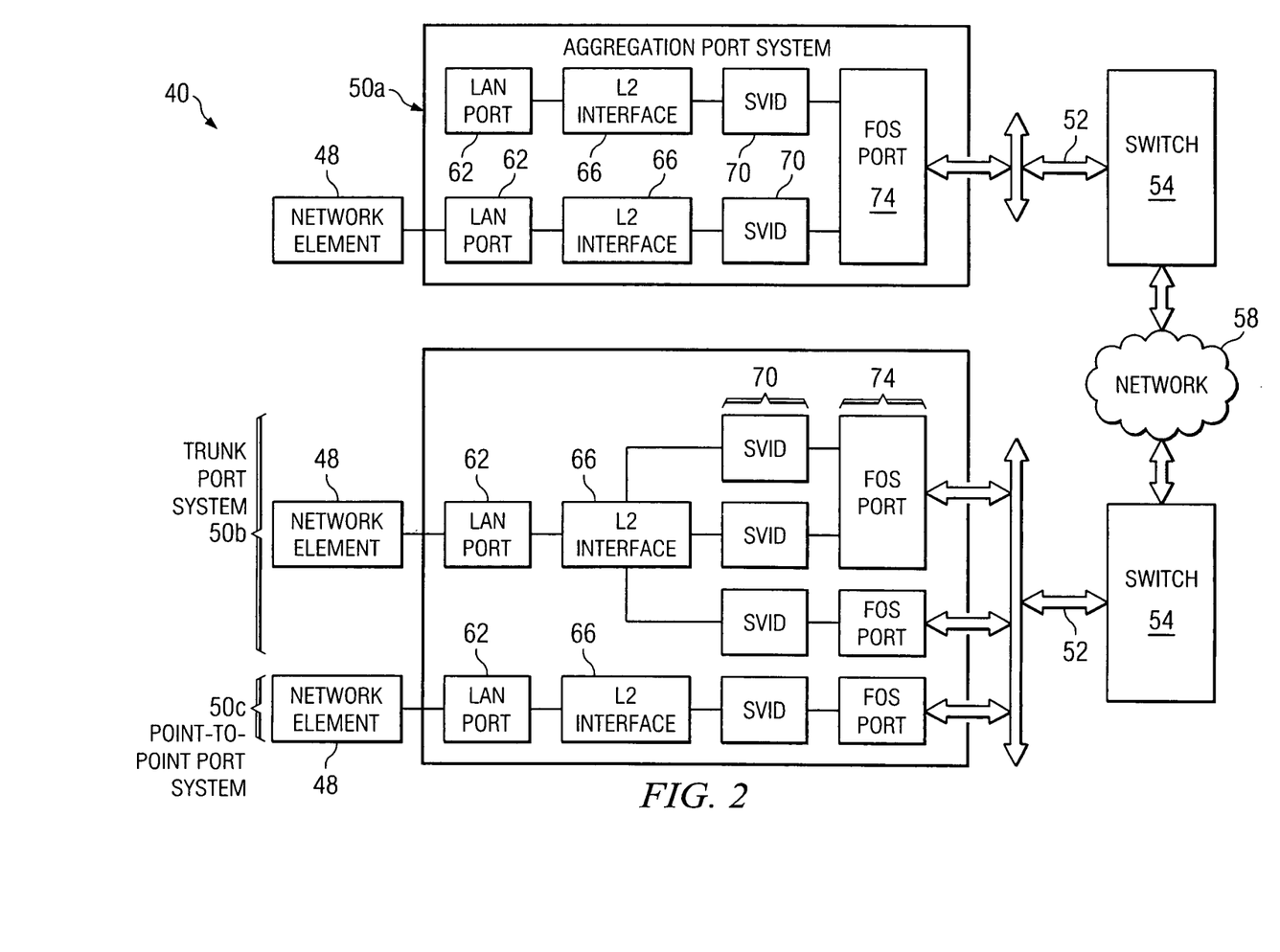
FIG. 2 is a block diagram illustrating an example system for mapping services to access services using the Synchronous Optical Network (SONET) protocol.

FIG. 2 is a block diagram illustrating an example system 40 for mapping services to access services for a WAN side that uses a Synchronous Optical Network (SONET) transport mechanism. According to the illustrated embodiment, system 40 may include network elements 48, port systems 50, fibers 52, switches 24, and a network 58 coupled as shown.

Network element 48 may be substantially similar to network element 16 of FIG. 1. A port system 50 may represent an interface that operates to couple LAN side equipment to WAN side equipment. As an example, a port system 50 may operate to couple a LAN side network element 48 to a WAN side switch 54.

A port system 50 may include components operable to couple LAN side equipment to WAN side equipment. According to the illustrated embodiment, a port system 50 includes one or more local area network (LAN) ports 62, Layer 2 (L2) interfaces (IFs) 66, System V Interface Definition (SVID) modules 70, and frame over SONET (FOS) ports 74 coupled as shown.

A LAN port 62 may be substantially similar to LAN port 20 of FIG. 1, and may comprise an Ethernet port. A Layer 2 interface 66 may represent a data link layer interface. Layer 2 interface 66 may operate to manage the communication lines, which may involve, for example, detection and correction of message errors.

A System V Interface Definition (SVID) module 70 may represent a module that allows source code portability between different platforms. As an example, a SVID module 70 may represent a module that operates according to the System V Interface Definition. A WAN port such as frame over SONET (FOS) port 74 may represent an interface operable to couple port system 50 to a fiber 52.

Port systems 50 may include one or more of an aggregation port system 50a, a trunk port system 50b, a point-to-point port system 50c, or other port system in any suitable combination. An aggregation port system 50a may operate to couple more than one LAN link to a single link such as a WAN link or another port system 50. The LAN link may be coupled by multiplexing individual LAN ports 62. The LAN ports may be multiplexed according to any suitable technique, for example, a multi-protocol label switching (MPLS) technique, a virtual local area network (VLAN) technique, or a generic framing procedure (GFP) technique.

A trunk port system 50b may couple a single LAN link to more than one link such as more than one WAN link or port system 50. As an example, trunk port system 50b may couple a LAN port 62 to more than one aggregate port system, point-to-point port system, or other port system. A point-to-point port system 50e may couple a single LAN link to a single link such as a WAN link, a LAN link, or port system 50.

Fibers 52 may be substantially similar to fibers 30 of FIG. 1, and may comprise optical fibers. Switch 54 may represent a fiber optic switch operable to switch optical signals, for example, a SONET/SDH switch. Network 58 may be substantially similar to network 32 of FIG. 1, and may comprise to an optical network, for example, a SONET network.

According to one embodiment of operation, port system 50 may be used to map a service from LAN side equipment to WAN side equipment. According to the embodiment, LAN ports 62 may be created. SVID modules 70 may be used to configure port system 50 by mapping LAN side service parameter values to WAN side network parameter values. WAN ports such as FOS ports 74 may be created between SVID modules 70 and FOS ports 74. FOS ports 74 may then be cross connected to switch 54. Flows from the WAN side may be individually labeled, and flows from the LAN side may be individually labeled with labels that identify the transport mechanism. Any suitable parameters may be used, and any suitable service parameter values may be mapped to any suitable network parameter values.

Modifications, additions, or omissions may be made to system 40 without departing from the scope of the invention. The components of system 40 may be integrated or separated according to particular needs. Moreover, the operations of system 40 may be performed by more, fewer, or other modules. Additionally, operations of system 40 may be performed using any suitable logic comprising software, hardware, other logic, or any suitable combination of the preceding.

Figure 3:
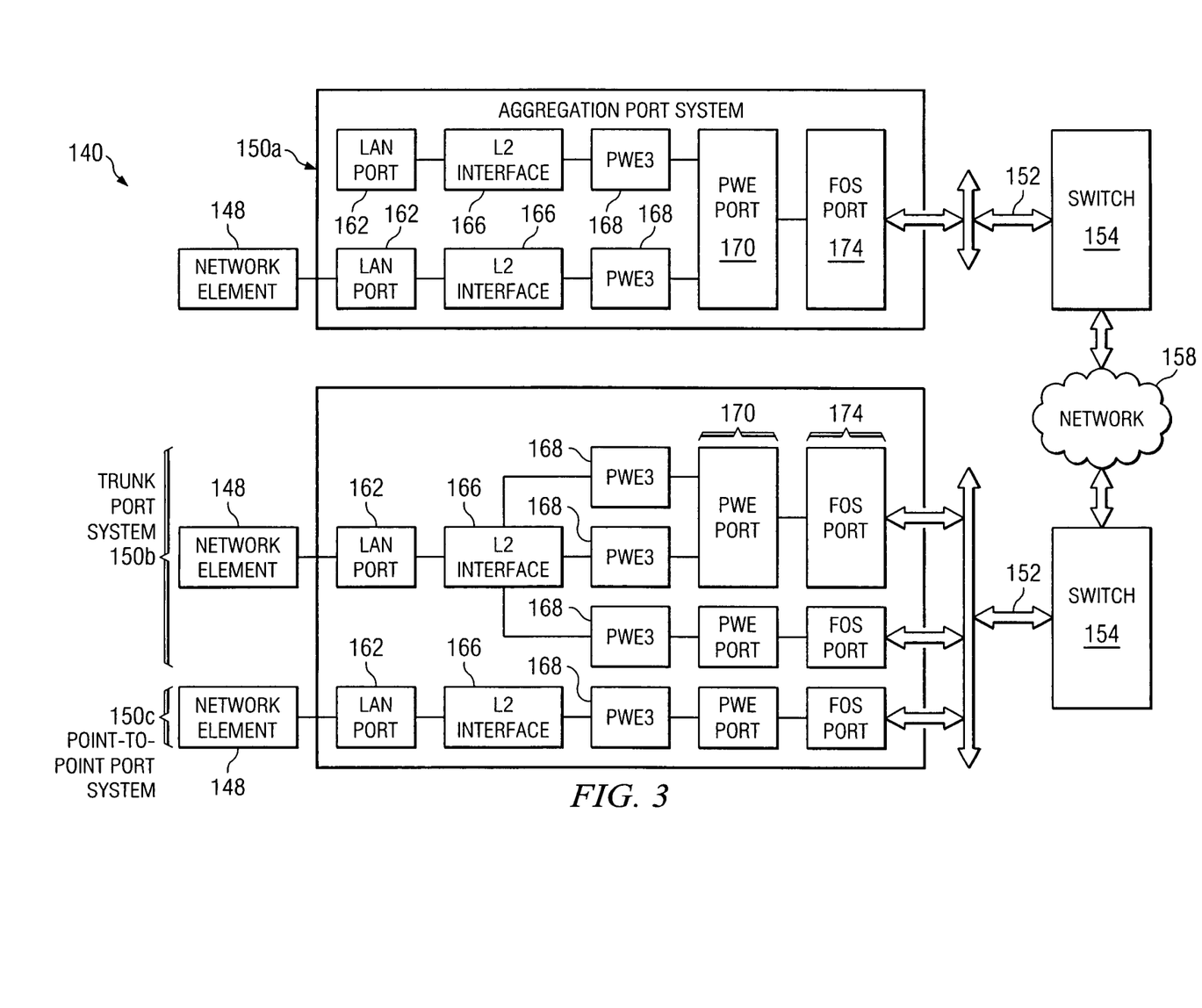
FIG. 3 is a block diagram illustrating another example system for mapping services to access services using the Pseudo-Wire Emulation (PWE) over SONET protocol.

FIG. 3 is a block diagram illustrating an example system 140 for mapping services to access services for a WAN side that uses a Pseudo-Wire Emulation (PWE) over SONET transport mechanism. According to the illustrated embodiment, system 140 may include network elements 148, port systems 150, fibers 152, switches 154, and a network 158 coupled as shown.

Network element 148 may be substantially similar to network element 16 of FIG. 1. A port system 150 may represent an interface that operates to couple LAN side equipment to WAN side equipment. As an example, a port system 50 may operate to couple a LAN side network element 148 to a WAN side switch 154.

A port system 150 may include components operable to couple LAN side equipment to WAN side equipment. According to the illustrated embodiment, a port system 50 includes one or more local area network (LAN) ports 162, Layer 2 (L2) interfaces (IFs) 166, Pseudo-Wire Emulation (PWE) modules 168, PWE ports 170, and frame over SONET (FOS) ports 174 coupled as shown.

A LAN port 162 may be substantially similar to LAN port 20, and may comprise an Ethernet port. A Layer 2 interface may represent a data link layer interface. Layer 2 interface 166 may operate to manage the communication lines, which may involve, for example, detection and correction of message errors.

A PWE module 168 may emulate attributes of a service, such as an asynchronous transfer mode (ATM), a frame relay, or an Ethernet service, over a packet switched network (PSN). PWE module 168 may perform according to pseudo wire emulation edge-to-edge (PWE3) technology. PWE module 168 may perform any suitable operations to emulate the behavior and characteristics of a service. For example, PWE module 168 may encapsulate service-specific packets arriving at an ingress port, carry the packets across a path or tunnel, manage the timing and order of the packets, perform any other suitable operable emulate the behavior and characteristics of the service, or any combination of the preceding. From the LAN side, PWE module 168 may be perceived as an unshared link of a chosen service.

WAN ports include PWE ports 170 and frame over SONET (FOS) ports 174. A PWE port 170 may operate according to PWE3 technology. A frame over SONET port 174 may represent an interface operable to couple port system 50 to a fiber 52.

Port systems 150 may include one or more of an aggregation port system 150a, a trunk port system 150b, a point-to-point port system 150c, or other port system in any suitable combination. Aggregation port system 150a, trunk port system 150b, and point-to-point port system 150c, may be substantially similar to aggregation port system 50a, trunk port system 50b, point-to-point port system 50c, respectively, of FIG. 2.

Fibers 152 may be substantially similar to fibers 30 of FIG. 1, and may comprise optical fibers. Switch 154 may represent a fiber optic switch operable to switch optical signals, for example, a SONET/SDH switch. Network 158 may be substantially similar to network 32 of FIG. 1, and may comprise to an optical network, for example, a SONET network.

According to one embodiment of operation, port system 150 may be used to map a service from LAN side equipment to WAN side equipment. According to the embodiment, LAN ports 162 may be created. PWE module 168 may be used to configure port system 150 by mapping LAN side service parameter values to WAN side network parameter values. WAN ports such as PWE ports 170 and FOS ports 174 may be created between PWE modules 170 and FOS ports 174. FOS ports 174 may then be cross connected to switch 154. Flows from the WAN side may be individually labeled, and flows from the LAN side may be individually labeled with labels that identify the transport mechanism. Any suitable parameters may be used, and any suitable service parameter values may be mapped to any suitable network parameter values.

Modifications, additions, or omissions may be made to system 140 without departing from the scope of the invention. The components of system 140 may be integrated or separated according to particular needs. Moreover, the operations of system 140 may be performed by more, fewer, or other modules. Additionally, operations of system 140 may be performed using any suitable logic comprising software, hardware, other logic, or any suitable combination of the preceding.

Figure 4:
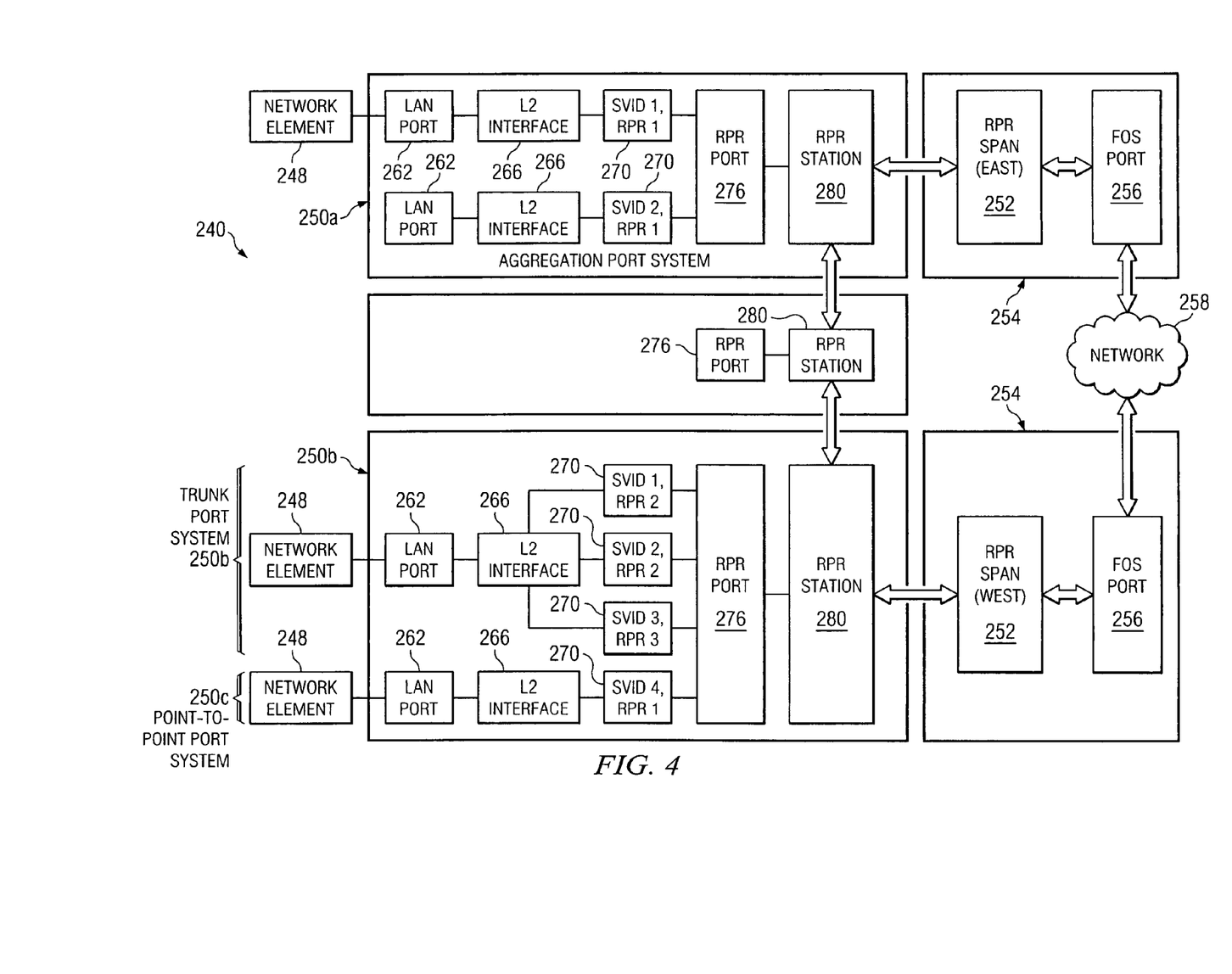
FIG. 4 is a is a block diagram illustrating yet another example system for mapping services to access services using the Resilient Packet Ring (RPR) over SONET protocol.

FIG. 4 is a is a block diagram illustrating yet another example system for mapping service parameters to access services for a WAN side that uses a Resilient Packet Ring (RPR) over SONET transport mechanism. The WAN side may operate according to the Resilient Packet Ring (RPR) specification developed by the IEEE as 802.17. The ring may be used to carry time division multiplex (TDM) traffic. According to the illustrated embodiment, system 240 may include network elements 248, port systems 250, switches 254, and a network 258 coupled as shown.

Network element 248 may be substantially similar to network element 16 of FIG. 1. A port system 250 may represent an interface that operates to couple LAN side equipment to WAN side equipment. As an example, a port system 250 may operate to couple a LAN side network element 248 to switch 254.

A port system 250 may include components operable to couple LAN side equipment to WAN side equipment. According to the illustrated embodiment, a port system 250 includes one or more local area network (LAN) ports 262, Layer 2 (L2) interfaces (IFs) 266, System V Interface Definition (SVID) modules 270, RPR ports 276, and RPR stations 280 coupled as shown.

A LAN port 262 may be substantially similar to LAN port 20 of FIG. 1, and may comprise an Ethernet port. A Layer 2 interface 264 may represent a data link layer interface. Layer 2 interface 264 may operate to manage the communication lines, which may involve, for example, detection and correction of message errors. A System V Interface Definition (SVID) module 270 may represent a module that allows source code portability between different platforms, and be substantially similar to System V Interface Definition (SVID) module 70 of FIG. 2.

WAN ports include RPR ports 276. An RPR port 276 may operate according to the Resilient Packet Ring protocol. A station 280 may represent a component operable to add packets to or drop packets from network 58. According to one embodiment, station 280 may comprise an RPR station, and may be embodied in a card that may be added to or removed from network element 250.

Port systems 250 may include one or more of an aggregation port system 250a, a trunk port system 250b, a point-to-point port system 150c, or other port system in any suitable combination. Aggregation port system 250a, trunk port system 250b, and point-to-point port system 250c may be substantially similar to aggregation port system 50a, trunk port system 50b, point-to-point port system 50c, respectively, of FIG. 2.

Switch 254 includes RPR spans 252 and frame over SONET (FOS) ports 256. An RPR span 252 may comprise a span of a fiber. A frame over SONET port 256 may represent an interface operable to couple RPR span 252 to network 258. Network 258 may be substantially similar to network 32 of FIG. 1, and may comprise to an optical network, for example, a SONET network.

According to one embodiment of operation, port system 250 may be used to map a service from LAN side equipment to WAN side equipment. According to the embodiment, LAN ports 262 may be created. SVID modules 270 may be used to configure port system 150 by mapping LAN side service parameter values to WAN side network parameter values. WAN ports such as RPR ports 276 may be created between SVID modules 270 and switch 254. A ring may be created on switch 254, and the ring may be cross-connected to network 258. Any suitable parameters may be used, and any suitable service parameter values may be mapped to any suitable network parameter values.

Modifications, additions, or omissions may be made to system 240 without departing from the scope of the invention. The components of system 240 may be integrated or separated according to particular needs. Moreover, the operations of system 240 may be performed by more, fewer, or other modules. Additionally, operations of system 240 may be performed using any suitable logic comprising software, hardware, other logic, or any suitable combination of the preceding.

Certain embodiments of the invention may provide one or more technical advantages. A technical advantage of one embodiment may be that service parameters may be used to map a service to a transport mechanism. The service parameter values of a service may be mapped to network parameter values of a transport mechanism to provide the service over the transport mechanism. The same service parameter values may be used to provide the service over different transport mechanisms. Accordingly, service parameters may allow for efficient mapping and re-mapping of a services.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing a service, comprising:
  establishing one or more service parameter values for a service, a service parameter value describing a metric of the service, the metric used to configure a local area network to perform at a level of service;
  mapping the one or more service parameter values to one or more first network parameter values, a first network parameter value operable to instruct a first wide area network having a first transport mechanism to perform at the level of service, the mapping comprising:
    determining the level of service provided by the service parameter values;
    selecting the first network parameter values to yield the level of service; and
    setting the first network parameter values according to the selection;
  providing the service over the first transport mechanism;
  mapping the one or more service parameter values to one or more second network parameter values, a second network parameter value operable to instruct a second wide area network having a second transport mechanism to perform at the level of service, the mapping comprising:
    determining the level of service provided by the service parameter values;
    selecting the second network parameter values to yield the level of service; and
    setting the second network parameter values according to the selection, the second network parameter values distinct from the first network parameter values;
  and providing the service over the second transport mechanism.

2. The method of claim 1, wherein mapping the one or more service parameter values to the one or more first network parameter values further comprises:
receiving a service parameter value corresponding to a network parameter value; and
executing a command to link the service parameter value to the network parameter value.

3. The method of claim 1, wherein mapping the one or more service parameter values to the one or more first network parameter values further comprises:
mapping the one or more service parameter values using a System V Interface Definition (SVID) module.

4. The method of claim 1, wherein mapping the one or more service parameter values to the one or more first network parameter values further comprises:
mapping the one or more service parameter values using a Pseudo-Wire Emulation module.

5. The method of claim 1, wherein providing the service over the first transport mechanism further comprises:
providing the service over a Synchronous Optical Network (SONET) transport mechanism.

6. The method of claim 1, wherein providing the service over the first transport mechanism further comprises:
providing the service over a Resilient Packet Ring (RPR) over Synchronous Optical Network (SONET) transport mechanism.

7. A system for providing a service, comprising:
an interface operable to communicate with a local area network; and
a processor coupled to the interface and operable to:
establish one or more service parameter values for a service, a service parameter value describing a metric of the service, the metric used to configure a local area network to perform at a level of service;
map the one or more service parameter values to one or more first network parameter values, a first network parameter value operable to instruct a first wide area network having a first transport mechanism to perform at the level of service, the mapping comprising:
determining the level of service provided by the service parameter values;
selecting the first network parameter values to yield the level of service; and
setting the first network parameter values according to the selection;
provide the service over the first transport mechanism;
map the one or more service parameter values to one or more second network parameter values, a second network parameter value operable to instruct a second wide area network having a second transport mechanism to perform at the level of service, the mapping comprising:
determining the level of service provided by the service parameter values;
selecting the second network parameter values to yield the level of service; and
setting the second network parameter values according to the selection, the second network parameter values distinct from the first network parameter values;
and
provide the service over the second transport mechanism.

8. The system of claim 7, the processor operable to map the one or more service parameter values to the one or more first network parameter values by:
receiving a service parameter value corresponding to a network parameter value; and
executing a command to link the service parameter value to the network parameter value.

9. The system of claim 7, the processor operable to map the one or more service parameter values to the one or more first network parameter values by:
mapping the one or more service parameter values using a System V Interface Definition (SVID) module.

10. The system of claim 7, the processor operable to map the one or more service parameter values to the one or more first network parameter values by:
mapping the one or more service parameter values using a Pseudo-Wire Emulation module.

11. The system of claim 7, the processor operable to provide the service over the first transport mechanism by:
providing the service over a Synchronous Optical Network (SONET) transport mechanism.

12. The system of claim 7, the processor operable to provide the service over the first transport mechanism by:
providing the service over a Resilient Packet Ring (RPR) over Synchronous Optical Network (SONET)transport mechanism.

13. Logic for providing a service, the logic embodied in a non-transitory medium and operable to:
establish one or more service parameter values for a service, a service parameter value describing a metric of the service, the metric used to configure a local area network to perform at a level of service;
map the one or more service parameter values to one or more first network parameter values, a first network parameter value operable to instruct a first wide area network having a first transport mechanism to perform at the level of service, the mapping comprising:
determining the level of service provided by the service parameter values;
selecting the first network parameter values to yield the level of service; and
setting the first network parameter values according to the selection;
provide the service over the first transport mechanism;
map the one or more service parameter values to one or more second network parameter values, a second network parameter value operable to instruct a second wide area network having a second transport mechanism to perform at the level of service, the mapping comprising:
determining the level of service provided by the service parameter values;
selecting the second network parameter values to yield the level of service; and
setting the second network parameter values according to the selection, the second network parameter values distinct from the first network parameter values;
and
provide the service over the second transport mechanism.

14. The logic of claim 13, operable to map the one or more service parameter values to the one or more first network parameter values by:
receiving a service parameter value corresponding to a network parameter value; and
executing a command to link the service parameter value to the network parameter value.

15. The logic of claim 13, operable to map the one or more service parameter values to the one or more first network parameter values by:
   mapping the one or more service parameter values using a System V Interface Definition (SVID) module.

16. The logic of claim 13, operable to map the one or more service parameter values to the one or more first network parameter values by:
   mapping the one or more service parameter values using a Pseudo-Wire Emulation module.

17. The logic of claim 13, operable to provide the service over the first transport mechanism by:
   providing the service over a Synchronous Optical Network (SONET) transport mechanism.

18. The logic of claim 13, operable to provide the service over the first transport mechanism by:
   providing the service over a Resilient Packet Ring (RPR) over Synchronous Optical Network (SONET) transport mechanism.

19. A system comprising one or more processors for providing a service, comprising:
   means for establishing one or more service parameter values for a service, a service parameter value describing a metric of the service, the metric used to configure a local area network to perform at a level of service;
   means for mapping the one or more service parameter values to one or more first network parameter values, a first network parameter value operable to instruct a first wide area network having a first transport mechanism to perform at the level of service, the mapping comprising:
      determining the level of service provided by the service parameter values;
      selecting the first network parameter values to yield the level of service; and
      setting the first network parameter values according to the selection;
   means for providing the service over the first transport mechanism;
   means for mapping the one or more service parameter values to one or more second network parameter values, a second network parameter value operable to instruct a second wide area network having a second transport mechanism to perform at the level of service, the mapping comprising:
      determining the level of service provided by the service parameter values;
      selecting the second network parameter values to yield the level of service; and
      setting the second network parameter values according to the selection, the second network parameter values distinct from the first network parameter values;
   and
   means for providing the service over the second transport mechanism.

20. A method for providing a service, comprising:
   establishing one or more service parameter values for a service, a service parameter value describing a metric of the service, the metric used to configure a local area network to perform at a level of service;
   mapping the one or more service parameter values to one or more first network parameter values, a first network parameter value operable to instruct a first wide area network having a first transport mechanism to perform at the level of service, the mapping the one or more service parameter values to the one or more first network parameter values further comprising:
      receiving a service parameter value corresponding to a network parameter value;
      executing a command to link the service parameter value to the network parameter the command configured to:
         determine the level of service provided by the service parameter value;
         select the first network parameter value to yield the level of service; and
         set the first network parameter value according to the selection;
      mapping the one or more service parameter values using a System V Interface Definition (SVID) module; and
      mapping the one or more service parameter values using a Pseudo-Wire Emulation module;
   providing the service over the first transport mechanism, the providing the service over the first transport mechanism further comprising:
      providing the service over a Synchronous Optical Network (SONET) transport mechanism; and
      providing the service over a Resilient Packet Ring (RPR) over Synchronous Optical Network (SONET) transport mechanism;
   mapping the one or more service parameter values to one or more second network parameter values, a second network parameter value operable to instruct a second wide area network having a second transport mechanism to perform at the level of service, the mapping comprising:
      determining the level of service provided by the service parameter values;
      selecting the second network parameter values to yield the level of service; and
      setting the second network parameter values according to the selection, the second network parameter values distinct from the first network parameter values;
   and
   providing the service over the second transport mechanism.

* * * * *